April 8, 1930.  W. R. DARNELL  1,753,599
FURNITURE GLIDE
Filed July 13, 1927

Inventor
W. R. DARNELL
By Earl M. Sinclair
Attorney

Patented Apr. 8, 1930

1,753,599

UNITED STATES PATENT OFFICE

WALTER RALEIGH DARNELL, OF LONG BEACH, CALIFORNIA

FURNITURE GLIDE

Application filed July 13, 1927. Serial No. 205,384.

The object of this invention is to provide an improved construction for a glide for furniture legs and the like which is made entirely of metal and is so constructed and reenforced as to prevent collapse, distortion, or separation of parts under the weight of a load.

A further object of the invention is to provide an improved furniture glide which is rust proof and which will slide readily on a floor surface and which is very compact and unobstrusive in appearance.

A further object of the invention is to provide a furniture glide which is relatively cheap to manufacture, easily assembled and very durable and efficient in use.

With these and other objects in view, my invention consists in the construction, arrangement and combination of elements hereinafter set forth, pointed out in the claims and indicated by the accompanying drawing in which—

Figure 1:
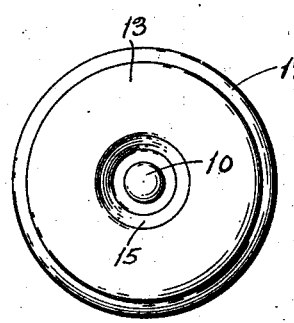
Fig. 1 is a plan view of a furniture glide embodying my improvements.
Figure 2:
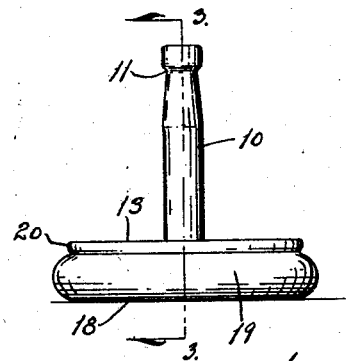
Fig. 2 is a side elevation of the same.
Figure 4:
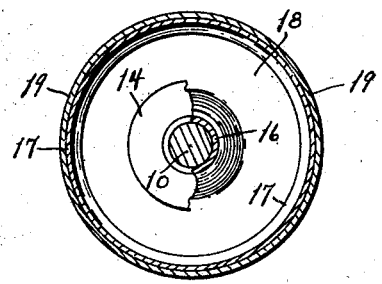
Fig. 4 is a horizontal section taken substantially on the line 4—4 of Fig. 3.

In the construction of the device as shown, I employ a stem or pintle 10 which preferably is formed with an annular groove or shoulder 11 near its upper end whereby it may be retained in a socket in a well known manner. At its lower end the stem 10 is formed with an integral head 12 which is plane on its lower surface. The numeral 13 designates a shell which is of circular form and provided at its center with a circular opening to receive and snugly embrace the lower portion of the stem 10. In assembling the shell 13 to the stem, a washer 14 is employed which fits loosely on the stem 10 and rests on the upper surface of the head 12 thereof. The shell 13 is formed in its central portion with an annular depression or counter sink 15 and the material at the center thereof is drawn and pressed tightly within the washer 14 to form a downturned flange 16 which has a tight fit around the stem 10 immediately above the head 12. By this means the stem, washer, and shell are rigidly assembled together. The shell 13 has an annular plane surface surrounding the central depression 15, which surface is designed to engage the lower surface of a load object such as a furniture leg or the like and the diameter of the shell may correspond substantially with the diameter of the leg if desired. The shell 13 is formed with a circumferential depending skirt 17. A shoe 18 is provided which is substantially plane on its lower surface and is formed with a circumferential upwardly extending wall 19 which fits outside of and closely engages the skirt 17 of the shell. The shoe 18 is assembled to the shell in a press by the application of considerable force force whereby the wall 19 is caused to frictionally engage and crimp inwardly at its upper margin upon the skirt 17 and whereby the outer margin of the shell is pressed downwardly to form a circumferential bead 20 around and projecting relative to the upper edge of the wall 19. In this manner the shell and shoe are rigidly assembled together and relative movement of the parts is prevented.

When the parts are assembled as shown and described, the central portion of the shoe 18 engages the lower surface of the head 12 of the stem. This prevents upward collapse or indentation of the central portion of the shoe under a load and also serves to maintain the correct position of said shoe in the event pressure is applied thereto in the operation of installing the glide in a load object.

Figure 3:
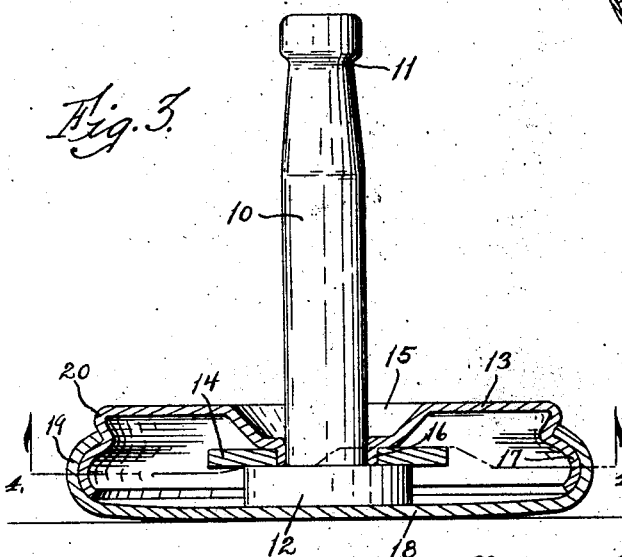
Fig. 3 is a detail vertical section of the glide on the line 3—3 of Fig. 2 on an enlarged scale.

The device is made entirely of metal and the shoe may be formed of plain steel, bronze, iron, stainless steel, or any other suitable metal. Stainless steel is a very desirable material for the shoe as it is very hard and tough and is capable of taking a polish which facilitates sliding of the device on a floor surface. The lower surface of the shoe 18 may be bowed downwardly somewhat as indicated in Fig. 3 to reduce the amount of surface which is in contact at a given time with a floor surface and thus reduce the friction in a sliding movement.

It is obvious that the device may be made in various sizes and that different types of stem may be employed such for instance, as a stem which is pointed and adapted to be driven into a load object by impact on the lower surface of the shoe.

I claim as my invention:

1. A furniture glide comprising a stem formed with an integral head at its lower end, a shell having a central aperture to receive said stem, the material of said shell being pressed into close engagement with said stem immediately above the head thereof, said shell being formed with a circumferential depending skirt, and a shoe having an upwardly extending wall pressed into frictional engagement with the outer surface of said skirt, said shell having at its inner periphery a substantially cylindrical flange embracing a portion of said stem and engaging at its lower end the head of said stem.

2. A furniture glide comprising a stem having an integral head at its lower end, a washer arranged for loosely engaging said stem above said head, a shell of annular form having at its inner periphery a substantially cylindrical flange pressed into the opening of said washer around and in close engagement with said stem and held between said washer and stem, said shell being formed with a circumferential depending skirt, and a shoe having an upwardly extending wall frictionally engaging the outer surface of said skirt.

WALTER RALEIGH DARNELL.